(12) United States Patent  
Gilboa

(10) Patent No.: US 8,185,559 B2  
(45) Date of Patent: May 22, 2012

(54) METHOD AND SYSTEM FOR OPERATING A TELECOMMUNICATION DEVICE USING A HASH TABLE IN PARTICULAR FOR PROTECTING SUCH DEVICE FROM ATTACKS

(75) Inventor: Niv Gilboa, Tel Aviv (IL)

(73) Assignee: Telecom Italia S.p.A, Milan (IT)

( * ) Notice: Subject to any disclaimer, the term of this patent is extended or adjusted under 35 U.S.C. 154(b) by 122 days.

(21) Appl. No.: 12/312,114

(22) PCT Filed: Oct. 27, 2006

(86) PCT No.: PCT/EP2006/010363  
§ 371 (c)(1),  
(2), (4) Date: Mar. 26, 2010

(87) PCT Pub. No.: WO2008/049450  
PCT Pub. Date: May 2, 2008

(65) Prior Publication Data  
US 2010/0185680 A1    Jul. 22, 2010

(51) Int. Cl.  
*G06F 17/30* (2006.01)

(52) U.S. Cl. ........................................ 707/802

(58) Field of Classification Search ............ None  
See application file for complete search history.

(56) References Cited

U.S. PATENT DOCUMENTS 5,432,852 A * 7/1995 Leighton et al. ............. 380/30  
7,584,507 B1 * 9/2009 Nucci ............................. 726/23  
2004/0199535 A1 10/2004 Zuk

OTHER PUBLICATIONS

Crosby, A. S. et al., "Denial of Service via Algorithmic Complexity Attacks," Department of Computer Science, Rice University, USENIX Security, 16 pages (2003).  
Carter, J. L. et al., "Universal Classes of Hash Functions," Journal of Computer and System Sciences, vol. 18, pp. 143-154, (1979).  
Black, J. et al., "UMAC: Fast and Secure Message Authentication," Advances in Cryptology—CRYPTO '99, Lecture Notes in Computer Science, vol. 1666, pp. 216-233, (1999).

* cited by examiner

*Primary Examiner* — Don Wong  
*Assistant Examiner* — Belinda Xue  
(74) *Attorney, Agent, or Firm* — Finnegan, Henderson, Farabow, Garrett & Dunner, L.L.P.

(57) ABSTRACT

A method for operating a telecommunications device using a hash table, includes: storing session data concerning received data packets in the hash table by means of a first hash function; monitoring the efficiency of the hash table in performing at least a predetermined operation, and in case the efficiency is below a predetermined threshold, storing further session data concerning received data packets by means of a second hash function different from the first hash function.

18 Claims, 10 Drawing Sheets

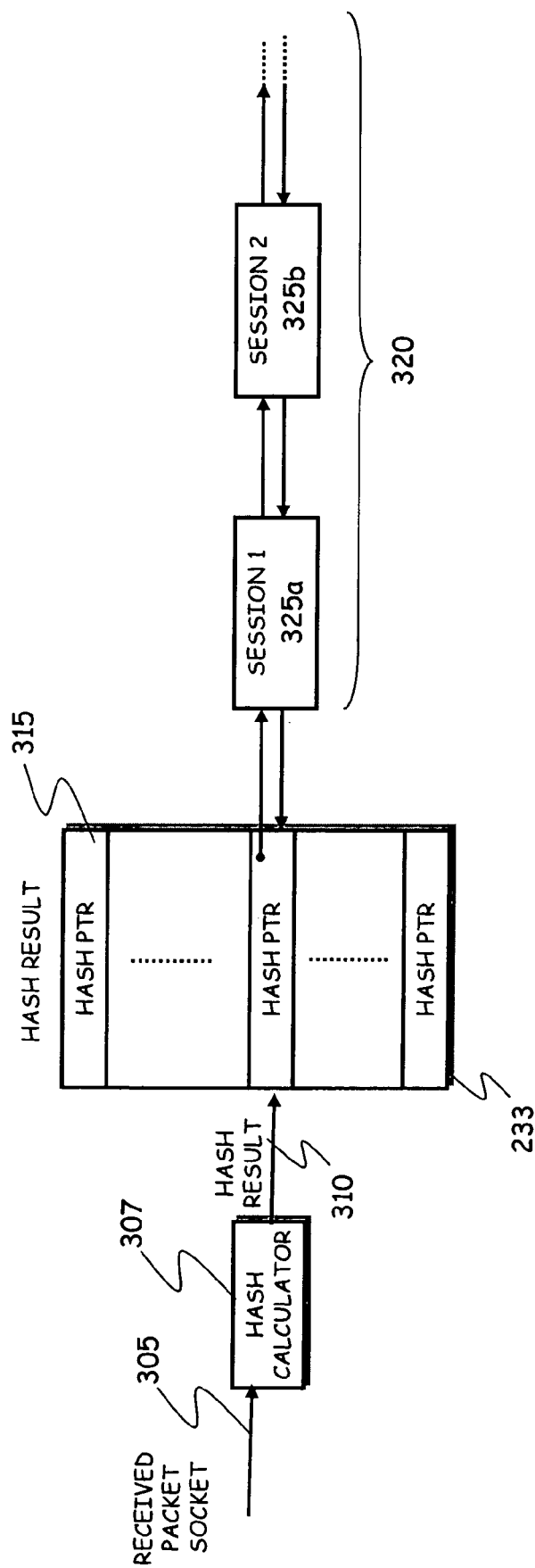

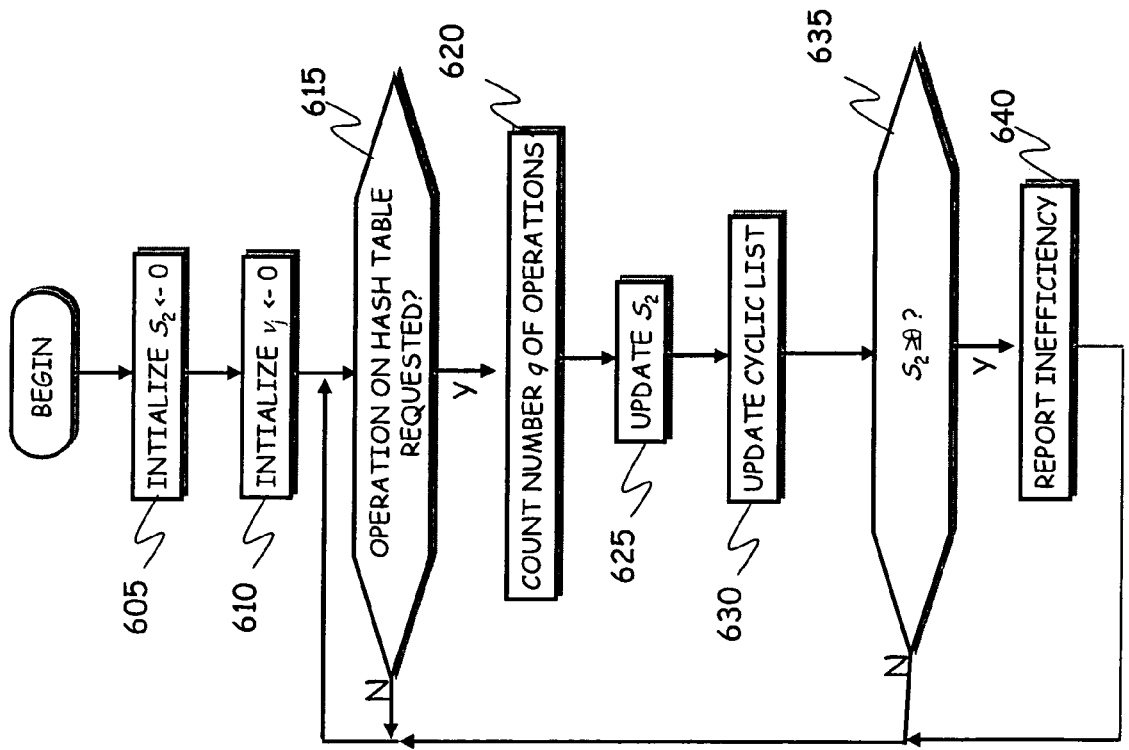

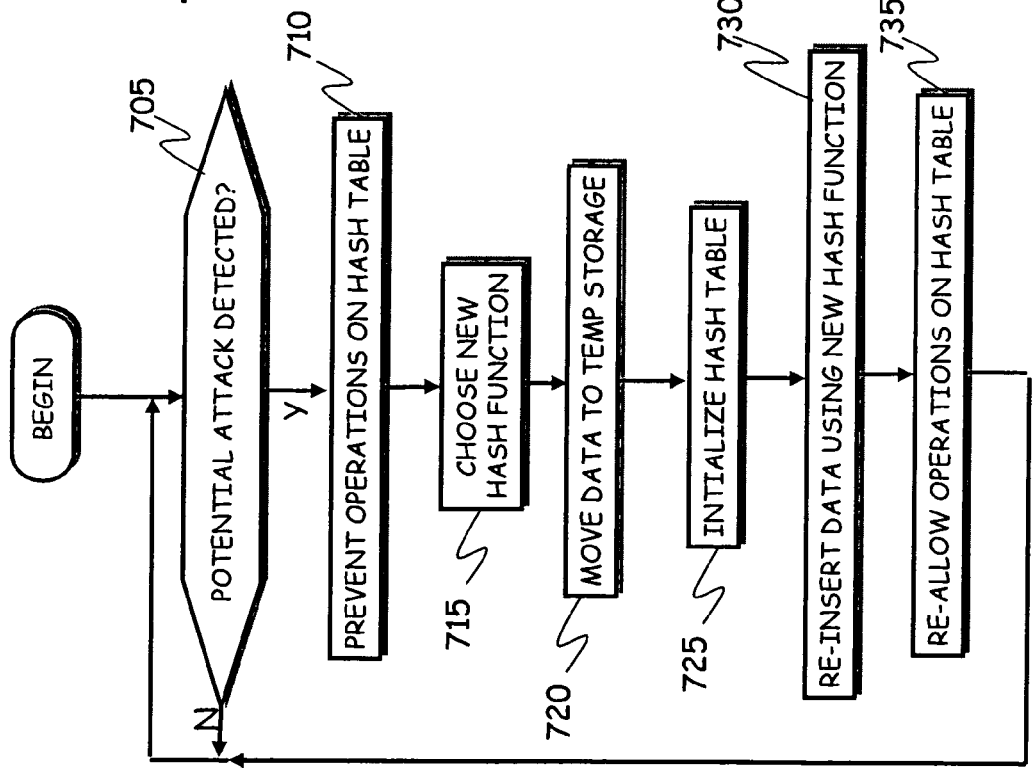
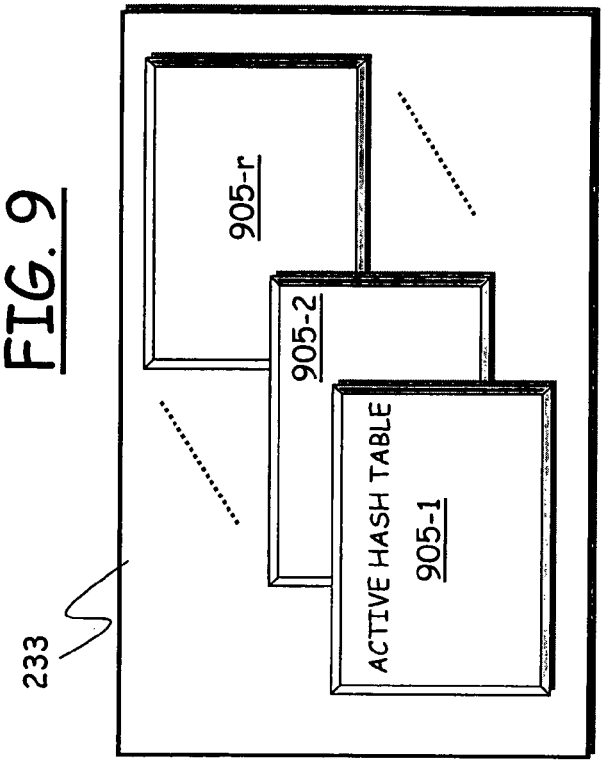

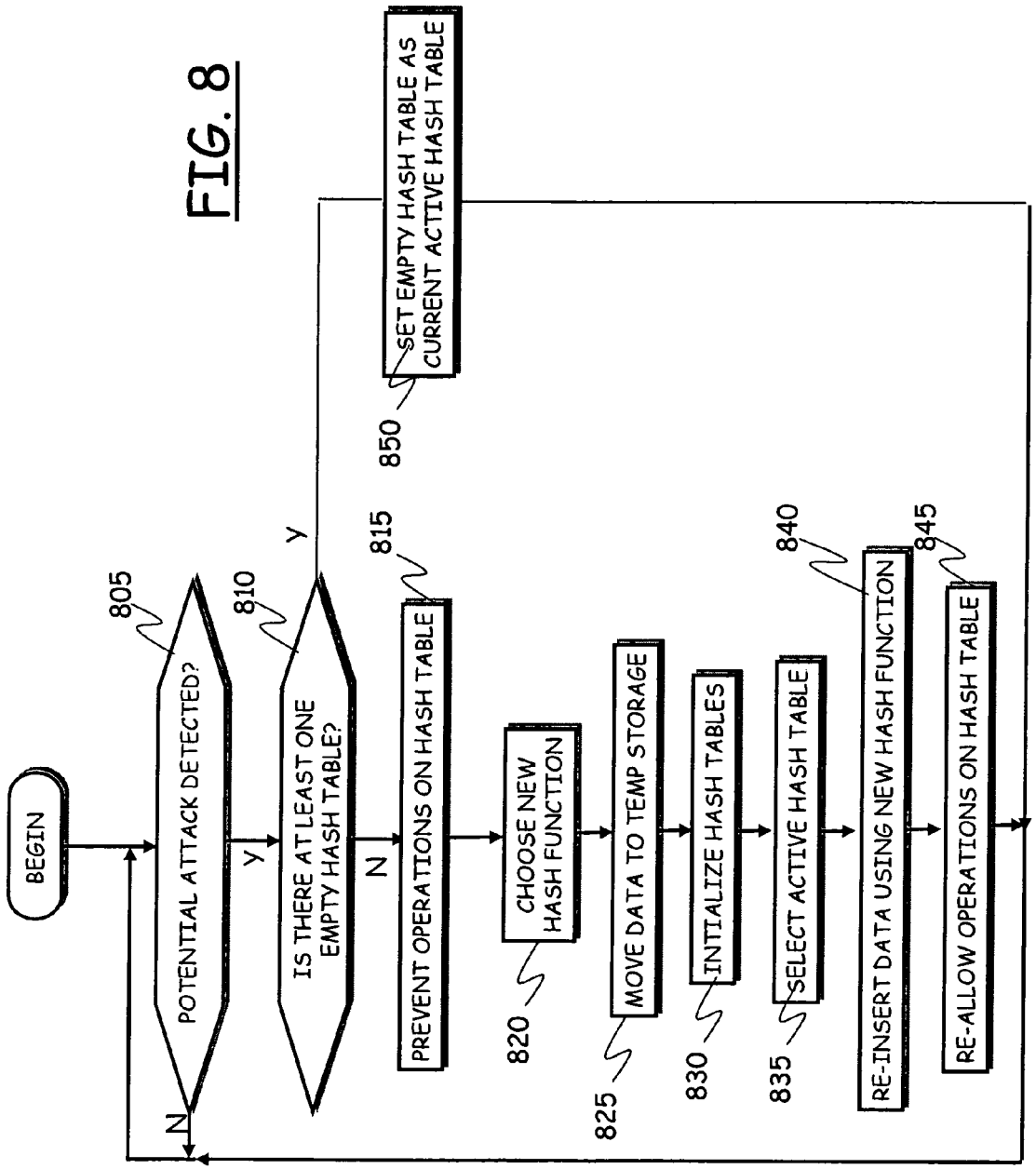

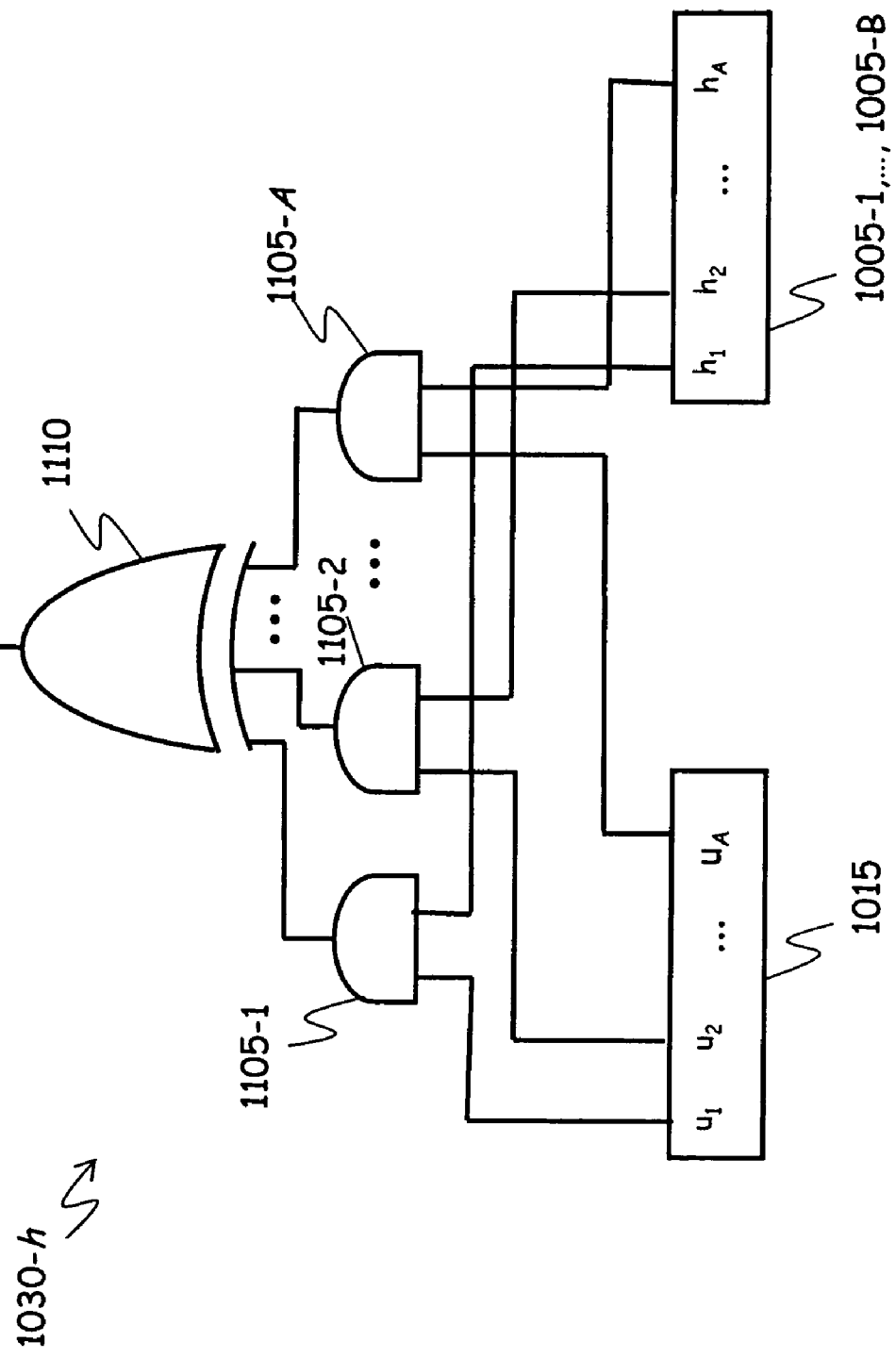

US 8,185,559 B2

METHOD AND SYSTEM FOR OPERATING A TELECOMMUNICATION DEVICE USING A HASH TABLE IN PARTICULAR FOR PROTECTING SUCH DEVICE FROM ATTACKS

CROSS REFERENCE TO RELATED APPLICATION

This application is a national phase application based on PCT/EP2006/010363, filed Oct. 27, 2006, the content of which is incorporated herein by reference.

BACKGROUND OF THE INVENTION

1. Field of the Invention

The present invention generally relates to the field of telecommunications and telecommunications networks, and to security issues related to telecommunications networks. More specifically, the present invention relates to methods and systems for protecting hash tables from attacks.

2. Description of the Related Art

Hash tables are widely used as a means for storing data in several technological fields, and particularly in the fields of telecommunications and networking. The reason of the extensive use of hash tables resides in the fact that hash tables allow inserting new data items, deleting obsolete data items and finding data items very efficiently in terms of average time per operation.

A hash table is a data structure that associates "keys" with "values": given a key (e.g. a person's name), it is possible to find the corresponding value (e.g. that person's telephone number). The hash table works by transforming the key using a hash function into a hash, a number that the hash table uses to locate the desired value.

In telecommunications applications, hash tables are used for creating fast accessible data bases, e.g. for storing billing information or customer line data. Typically, networking devices, like for example gateways, routers, firewalls, and the like, store data items, e.g. IP (Internet Protocol) addresses, TCP/IP (Transmission Control Protocol/Internet Protocol) sessions, IPsec security associations etc., in a properly indexed hash table.

The mapping of data items to entries of the hash table is performed by a hash function, which receives as an input the key of a data item (such as a session's socket), and outputs an entry number of an entry of the hash table to which that data item is mapped. If several items are mapped to the same hash table entry, a situation referred to as a "collision" takes place. Method for resolving collisions are used, e.g. storing all the data items that are mapped to a same hash table entry in a linked list (a technique referred to as "hash chaining").

The distribution of data items within a hash table, controlled by the adopted hash function, is critical to the efficiency of the data structure. The more even the distribution, the more efficient the table.

As known in the art, telecommunications apparatuses may be subjected to malicious attacks. Among the various types of malicious attacks that are experienced in the telecommunications and networking environments, one of the most common and effective is referred to as "Denial of Service" (DoS). The purpose of this type of attack is to reduce the capacity of some entity (e.g., a device, a software application, a network etc.) to perform the intended functions. A typical example of DoA attack is an attack against an e-commerce site, in which the web servers of the site are flooded with many bogus requests, thus leaving no resources to process legitimate requests. A DoS attack can be perpetrated against any component of the system which is required for providing a service and which can be affected in some way by an attacker.

Using a constant hash function in a networking or telecommunications device is known to expose the device to DoS attacks. The reason for this vulnerability is that an attacker may succeed in discovering the hash function used to map data items to the hash table, and thus to control part of the indexing key of a data item. The attacker may then be able to dictate the hash table entry in which the data item is stored. For example, if the networking device is a TCP/IP server and the attacker has an appropriate client software, then the attacker can control the client's port in the TCP/IP traffic (packets) sent to the networking device. If the networking device wishes to store in a hash table data concerning sessions opened to it, then a natural indexing key may be formed by the quintuple <Server IP address, Client IP address, IP protocol, Server port, Client port> (or, possibly, the indexing key may be only <Client IP address>). If the client port is controlled by the client, and thus by the attacker, the attacker can set it and, consequently, he/she can possibly control the entry in which the data items are stored. The aim of the attacker is to cause as many items as possible to be stored in a single entry of the attacked device's hash table; for example, the attacker may set up a lot of sessions, all of which are mapped to the same entry of the hash table. If k items are stored in a single hash table entry, then, on average, finding a new item in that entry takes O(k) operations, instead of O(1) (wherein O(k) means that the number of necessary operations increases with the increase of k, whereas O(1) means a constant number of operations). Thus, the lookup process in the networking device for, e.g., determining to which session received packets belong, is significantly slowed down, with the consequence that the overall performance of the networking device is reduced, causing a DoS condition.

In J. L. Carter and M. N. Wegman, "Universal classes of hash functions", Journal of Computer and System Sciences (JCSS), 18(2), pp. 143-154, April 1979, and subsequently in S. Crosby and D. Wallach, "Denial of service via algorithmic complexity attacks", in USENIX Security, 2003, it has been proposed to use a randomly selected hash function, instead of a constant (deterministic) hash function. More specifically, it was proposed to choose a universal family of hash functions and to select the hash function at random from that family. The underlying idea is that an attacker who has no prior knowledge of the hash function used to map data items to hash table entries is unable to predict which data items are mapped to each entry in the hash table; thus, the attacker cannot intentionally cause a large number of data items to be inserted into a single table entry, and so the above attack is avoided.

In J. Black et al., "UMAC: Fast and Secure Message Authentication", Advances in Cryptology—CRYPTO '99, Lecture Notes in Computer Science, vol. 1666. pp. 216-233, Springer, 1999, a message authentication algorithm is proposed that uses a new universal hash function family, referred to as "NH".

SUMMARY OF THE INVENTION

The Applicant has observed that the solution known in the art for blocking DoS attacks on hash tables is affected by some problems.

In particular, while choosing a hash function randomly out of a universal family of hash functions, instead of using a constant hash function, undoubtedly makes it more difficult for an attacker to perpetrate an effective attack, a problem that, according to the Applicant, remains to be solved is that if an attack does eventually take place, then there is no method of recovery from such condition. In other words, if the attacker is able, in spite of the above-mentioned protection, to acquire enough information about the randomly chosen hash function to attack the hash table, then a randomly chosen hash function is as vulnerable as a constant hash function.

Another problem to be solved is how to find a universal family of hash functions which can be efficiently implemented. In this respect, while several constructions are known that can be implemented efficiently in software running on a general-purpose CPU, like for example the NH universal family of hash functions disclosed in the paper by J. Black et al., as far as the Applicant is aware, efficiently implementing a universal family of hash functions in tailor-made hardware remains an unresolved issue.

The Applicant has tackled the problem of providing a method to more efficiently protect devices/systems using hash tables, like telecommunications and networking devices, against attacks of the DoS type on a hash table data structure.

The Applicant has found that a hash table data structure can be more efficiently protected against such kinds of attacks provided that a way to detect when the hash table is possibly under attack (either intentional or not) is implemented, and, in the affirmative case, suitable actions are undertaken for recovering from that state before the hash table becomes almost totally inoperative, or excessively slow.

The hash functions used to map data items to hash table entries may in particular be chosen randomly out of a universal family of hash functions, although this is not a limitation for the present invention. In a preferred invention embodiment, a universal family of hash functions is proposed that can be efficiently implemented in hardware providing very fast computation of hash values.

According to an aspect of the present invention, a method for operating a telecommunications device using a hash table is proposed, which comprises:
- storing session data concerning received data packets in the hash table by means of a first hash function;
- monitoring the efficiency of the hash table in performing at least a predetermined operation, and
- in case the efficiency is below a predetermined threshold, storing further (i.e. subsequent) session data concerning received data packets by means of a second hash function different from the first hash function.

The method may further comprise selecting the second hash function at random from a universal family of hash functions.

The further session data are stored in said hash table.

In case the efficiency is below a predetermined threshold, the operations of insertion, deletion and retrieval in said hash table may be temporarily prevented.

The method may further comprise, in case the efficiency is below a predetermined threshold, transferring all the session data stored in said hash table to a temporary data structure.

After transferring all the session data stored in said hash table to a temporary data structure, said hash table may be initialized to an empty state.

The method may further comprise inserting back the session data transferred to the temporary data structure into said hash table by using the second hash function.

Furthermore, after inserting back the session data, the operations of insertion, retrieval and deletion on the hash table may be re-allowed.

Said hash table may be a current active hash table in a plurality of available hash tables.

In an embodiment of the invention, the method may further comprise, in case the efficiency is below a predetermined threshold, ascertaining if there is an empty hash table among said plurality of available hash tables.

In case there is an empty hash table among said plurality of available hash tables, the current active hash table may be designated as a previous active hash table, the empty hash table may be designated as a new active hash table, and the further session data are stored in the new active hash table.

All the session data stored in the previous active hash table may be transferred into the new active hash table.

A copy may be kept of all the transferred session data in the previous active hash table.

In case there is no empty hash table among said plurality of available hash tables, the method may comprise temporarily preventing operations of insertion, deletion and retrieval in all said hash tables.

Also, in case there is no empty hash table among said plurality of available hash tables, all the session data stored in all said hash tables may be transferred to a temporary data structure.

After transferring all the session data stored in all said hash tables to a temporary data structure, all said hash tables may be initialized to an empty state.

One of said hash tables may be designated as a new active hash table, and all the session data transferred to the temporary data structure may be inserted into the new active hash table by using the second hash function.

The method may further comprise, after inserting all the session data into the new active hash table, re-allowing the operations of insertion, retrieval and deletion on the new active hash table, and storing the further session data in the new active hash table.

In particular, said monitoring the efficiency of the hash table may include measuring an average number of elementary operations required by the hash table for performing said at least a predetermined operation.

Said monitoring the efficiency of the hash table may alternatively include counting a number of stored data items processed by the hash table for performing said at least a predetermined operation.

Said at least a predetermined operation may comprise at least one among a data insertion operation, a data retrieval operation and a data deletion operation.

According to another aspect of the present invention, a telecommunication device is provided, comprising:
- at least one hash table;
- a hash calculator adapted to calculate a hash value based on a predetermined hash function, and to provide the calculated hash value to the hash table as a key for accessing the hash table;
- a hash table monitor module configured for monitoring an efficiency of the hash table in performing at least a predetermined operation, and, in case the efficiency is below a predetermined threshold, to select a different hash function.

The hash table monitor module may be configured for measuring an average number of elementary operations required by the hash table for performing said at least a predetermined operation.

The hash table monitor module may be alternatively configured for counting a number of stored data items processed by the hash table for performing said at least a predetermined operation.

Said at least a predetermined operation may comprise at least one among a data insertion operation, a data retrieval operation and a data deletion operation.

Said at least one hash table may include at least a first and a second hash tables, the first hash table being adapted to be used as a current active hash table wherein new data items are stored; said hash table monitor may be adapted to: upon ascertain that the efficiency of the first hash table is below a predetermined threshold, ascertaining if the second hash table is empty, and, in the affirmative case, set the second hash table as the current active hash table, whereas in the negative case, select a new hash function to be used by the hash calculator and to cause re-hashing.

Also, there is provided a device for implementing hash tables, included in the hash calculator. This device comprises:
a plurality of registers, wherein:
said plurality of registers comprises a number of registers equal to a predefined maximum number of output bits of the hash functions to be implemented;
each register of said plurality of registers has a size equal to a predefined maximum number of input bits of the hash functions to be implemented;
each register of said plurality is adapted to be loaded with hash function configuration data defining a hash function to be implemented;
associated with each of said registers, a respective multiplier configured to receive the content of the associated register and a hash function input, and to perform multiplication thereof, an output of the multiplier forming one of the hash function output bit.

The device may further comprise a source of hash function configuration data operatively associated with said plurality of registers for providing thereto the hash function configuration data.

Said source of hash function configuration data may comprise a random number generator.

The device may further comprise a hash function input register having size at least equal to said maximum number of input bits of the hash functions to be implemented, said input register being configured to receive the hash function input and to feed the plurality of registers.

The device may further comprise an output register of size at least equal to said maximum number of output bits of the hash functions to be implemented and operatively coupled to said multipliers so as to receive and store the output thereof.

Each of said multipliers may comprise:
a plurality of AND logic gates, each one configured to perform a logic AND of a respective bit of one of said plurality of registers and a respective bit of the hash function input; and
an XOR logic gate configured to receive outputs of the plurality of AND logic gates.

BRIEF DESCRIPTION OF THE DRAWINGS

FIG. 3 schematically shows a hash table used by the device of FIG. 2;

FIG. 6 is a schematic flowchart illustrating a method of measuring a hash table operation efficiency according to another embodiment of the present invention, adapted to be used in the method of FIG. 4;

FIG. 7 is a schematic flowchart illustrating a method of recovering from a condition of potential attack against the hash table, according to an embodiment of the present invention;

FIG. 8 is a schematic flowchart illustrating another method of recovering from a condition of potential attack against the hash table, according to an embodiment of the present invention;

FIG. 9 schematically shows a plurality of hash tables to be used in the method of FIG. 8;

FIG. 11 schematically shows an implementation of a multiplier unit of the hash calculator of FIG. 10.

DETAILED DESCRIPTION OF THE PREFERRED EMBODIMENT(S) OF THE INVENTION

Figure 1:
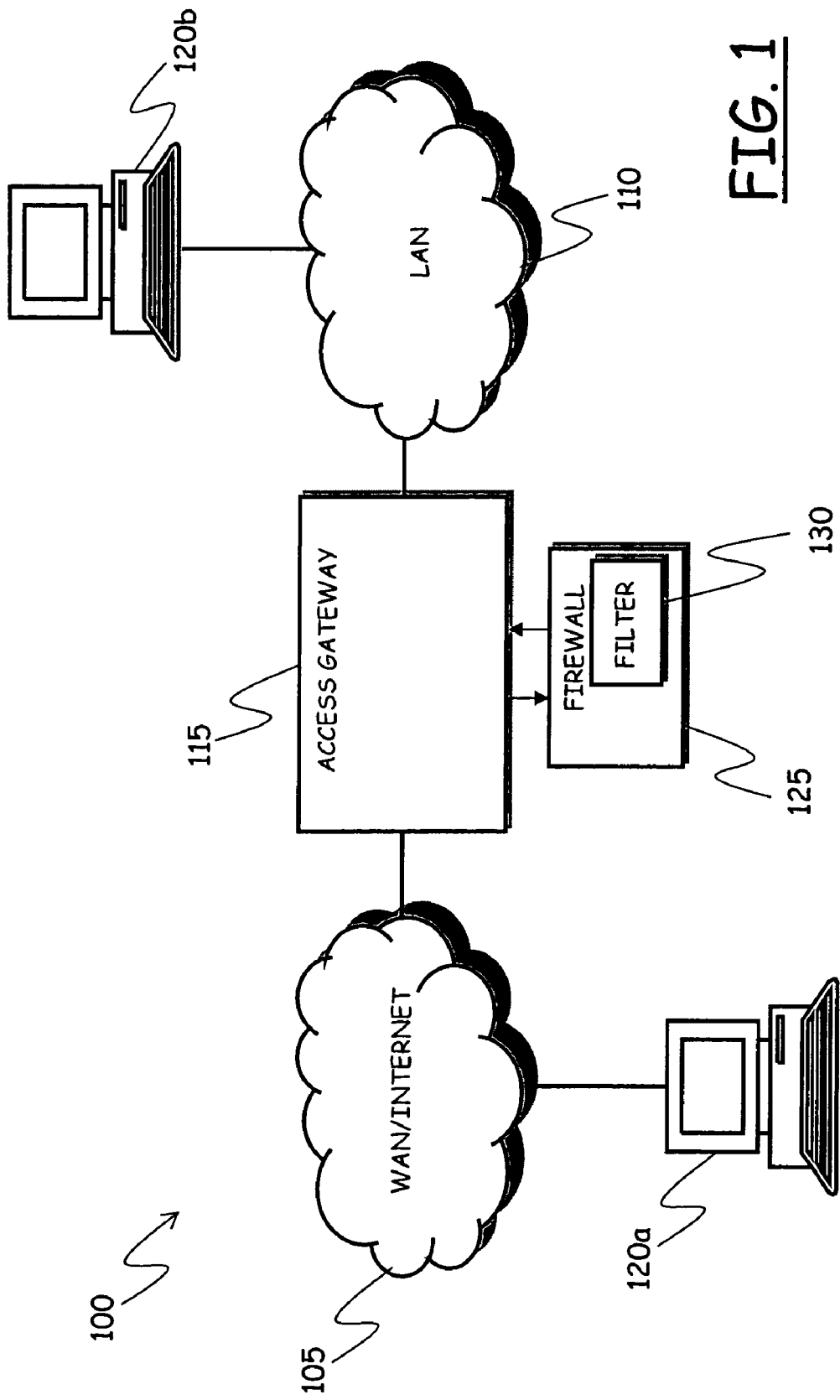
FIG. 1 schematically depicts a scenario wherein the present invention can be applied.

With reference to FIG. 1, a scenario wherein the present invention can be applied is pictorially shown. In particular, the scenario considered is that of a telecommunications system 100, comprising a public, open data communications network 105, like the Internet or a WAN (Wide Area Network), and a private data communications network 110, like for example a LAN (Local Area Network) of, e.g., an enterprise, or a SoHo (Small-office Home-office). The public network 105 and the private network 110 are in communications relationship through a networking apparatus 115 like for example an access gateway interposed therebetween, so that data processing apparatuses (e.g., PCs) 120a connected to public network 105 can communicate with data processing apparatuses (PCs) 120b connected to the private network 110.

The access gateway 115 is connected to a firewall 125 configured to prevent unauthorized access to the private network 110. The firewall 125 can be either generically a separate block or an integrated function, and it includes a dynamic filter 130, suitable to filter traffic packets received from PCs 120a connected to the Internet 105 and directed to the private network 110, and vice versa.

The data stream through the access gateway 115 can be of any kind, in accordance with the particular application, such as frames, packets, bytes, PDUs (Packet Data Units), etc. In the following, merely by way of example, the input data stream is considered to be a sequence of packets.

It is observed that a device like the firewall 125 may also be provided in portable data processing apparatuses, like cellular phones and PDAs (Personal Digital Assistants) having wireless communications capabilities, adapted to connect to the Internet.

The firewall 125, which can be implemented in hardware, software or as a combination of hardware and software, is adapted to filter packets received over an input packet stream, for both inbound packets from the public network 105 and outbound packets from the private network 110. he firewall 125 is, in its most efficient implementation, able to keep dynamic control of the active connections.

Figure 2:
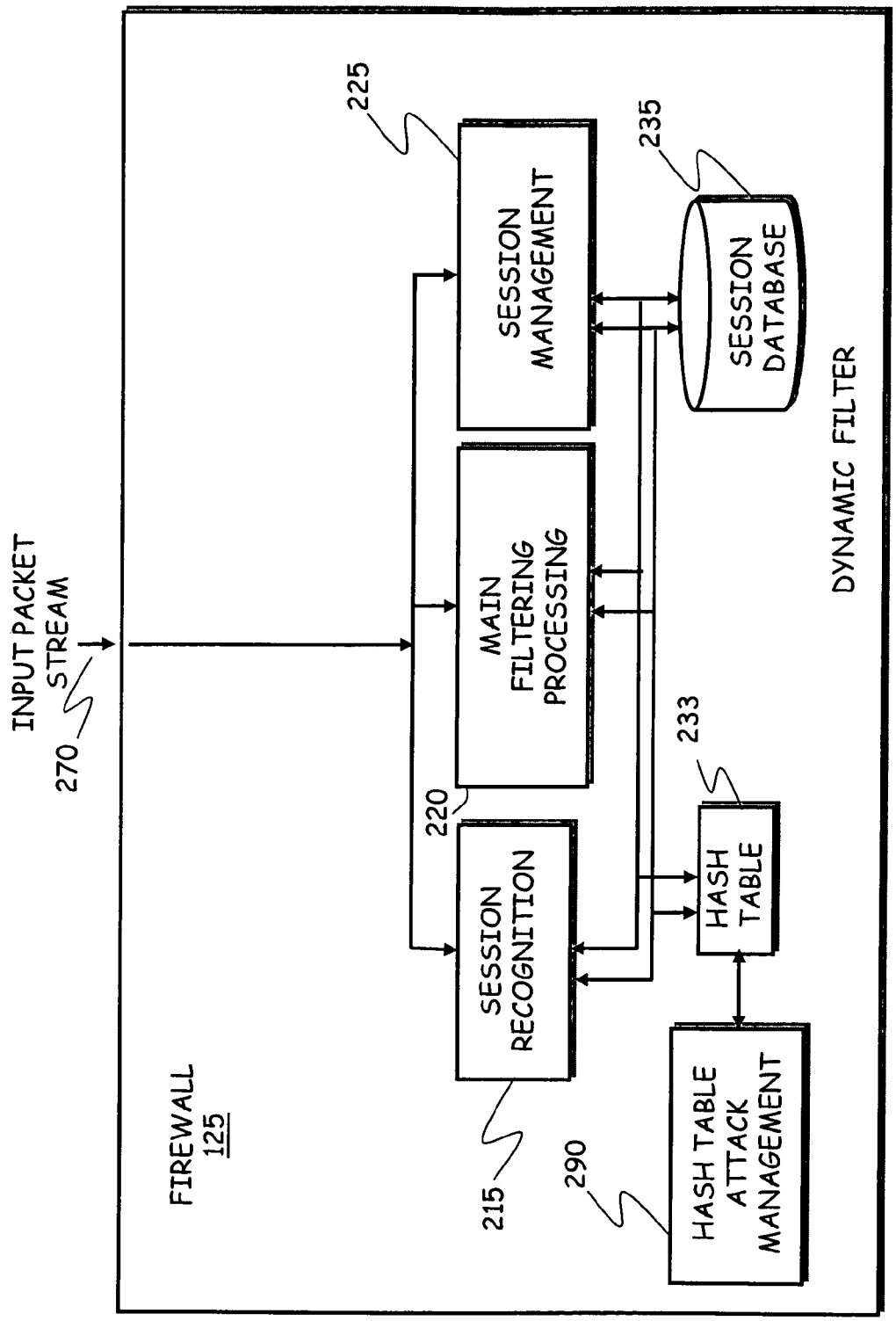
FIG. 2 schematically shows, in terms of the main functional blocks, a networking device used in the scenario of FIG. 1 and exploiting a hash table for storing data.

With reference to FIG. 2, the firewall 125 comprises a session recognition module 215, a main filter processing module 220, a session management module 225, a hash table 233 and a session database 235.

The session database 235 is a connection table by means of which the firewall 125 is able to keep track and monitor the state of the different communications sessions. In the session database 235, each session is associated with a respective session identifier (session ID). In particular, the session database 235 is suitable to store the socket and other session related data, including session state and current status, for use by the various processing modules (grouped in the main filter processing module block 220, for the sake of clarity) of the firewall to decide whether to allow or drop the packet. The hash table 233 is used to speed up the process of recognition of sessions.

The session recognition module 215 is suitable to search in the session database 235, on the basis of a socket associated with the packet, for an open session matching the socket.

The session management module 225 is suitable to add a new session to the session database 235 if it complies with a static security policy rule. Once a session is created, subsequent packets corresponding to this session are inspected in accordance with the session state for the particular protocol associated with the packet. The packet is allowed only if it conforms to the specifications of the particular protocol. The session management module 225 is also suitable to keep a hash linked list and a least recently used (LRU) linked list whereby sessions are added to and deleted from the lists.

When packets from the public network 105 are received at the access gateway 115, they are delivered to the firewall 125 and a hashing is performed therein to identify the session and store and retrieve information from the related session database 235. In particular, when an input packet stream 270 is received by the firewall 125, data suitable to identify the session which the packet belongs to is extracted by the session recognition module 215. The session recognition is performed by the session recognition module 215 by using a hashing technique. The data used for session recognition purposes can include for example 104 bit socket data including 32 bit source and destination IPv4 address, 16 bit source and destination port, 8 bit protocol, and a dynamic function value indicating the type of layer 4 packet, e.g., ICMP, ARP, TCP, UDP, etc. for the TCP protocol; it can also include 32 bit sequence number, 32 bit acknowledge, 11 bit payload length and 16 bit window size, depending on the specific implementation.

Also shown in FIG. 2 is a hash table attack management module 290, which, according to an embodiment of the present invention, is suitable to monitor the functionality of the hash table 233, to detect conditions of potential malicious attacks perpetrated against it, and to recover from an ongoing attack condition when detected, as described in detail later.

The firewall 125 is suitable to process packet data in three stages, wherein session data associated with the packet is read from the session database 235 in a first stage, the data are then processed in a second stage, and the results of the processing are written back to session database 235 in a third stage The session recognition process performed will now be described in more detail.

A diagram illustrating the hashing technique of determining the session associated with an input packet is shown in FIG. 3. Each session corresponds to a unique socket A session is identified by comparing the socket in the received packet to the sockets associated with previously opened sessions, stored in the session database 235. To speed up the recognition of a session, the hash table 233 is used, which stores hash pointers to session records stored in the session database 235, and that permits rapid lookup of the session corresponding to a received packet's socket.

In particular, newly opened sessions are stored in the session database 235, and a hash on the corresponding socket is calculated. A hash pointer is stored at a location (entry) in the hash table 233 pointed to by the hash result (initially, each entry in the hash table 233 is initialized to NULL). If the hash result calculated for the socket of more than one session coincides (the collision situation referred to in the foregoing), the sessions are put in a linked list.

Upon receipt of a packet, the packet socket 305 is input to a hash calculator 307 (considered as included in the block 233 representing the hash table), which is designed to generate and output a hash result (i.e. a hash value) 310. The hash result 310 is used as the index (key) to the hash table 233, which comprises a plurality of entries 315 each containing a hash pointer, in order to retrieve the hash pointer corresponding to the packet's socket. The hash pointer at the generic hash table entry points to NULL if there is no session record associated with that entry in the session database 235, to a single session record if there is only one session record associated with that entry, or to a linked list 320 of session records 325a, 325b, ..., if there are at least two session records associated with that entry. Each linked list comprises "previous" and "next" pointers, thus implementing a doubly linked list.

If the hash pointer points to NULL, a message "session not found" may be generated. If a hit on the socket occurs, each session in the linked list has to be checked for a match with the socket of the received packet. In other words, if the hash pointer is not NULL, the socket of the first session 325a in the linked list 320 is read from the session database 235 and compared to the socket of the received packet. If the two sockets match, a session match is found and reported to the main filtering processing module 220. If the sockets do not match, the next session record 325b in the linked list 320 is read from the session database 235, and the actions repeated, until either a socket match is found, or the last session record in the linked list 320 is reached (the one having the "next" pointer pointing to NULL).

For a good behavior of the hash table, the hash function should produce as even a spread as possible of hash results across the hash table.

The above description provides an example of practical use of hash tables. The formal aspects of hashing technique relevant to the invention will be now presented.

In general terms, a hash table is an entity defined by a universe U of input objects or items, by a table T, which is an array of |T| entries, and by a hash function h: U→T that maps input items belonging to the universe U to entries of the table T. Referring to the practical application described above, the input items are the sockets 305 of the received packets, and the hash function is the function implemented by the hash calculator 307 for calculating the hash result 310 from the received packet's socket 305. A collision is said to occur when two or more input items are mapped to a same table entry (in the practical implementation above, the hash result 310 calculated by the hash calculator 307 in respect of two distinct sockets coincides). A known collision resolution technique calls for using a linked list associated with each hash table entry, containing all the input items (in the example, sessions) mapped to that entry.

A hash table generally supports three basic operations on data items:

1. insertion of a new data item: the input item u∈U is inserted into a table entry h(u), taking into account the collision resolution mechanism of the table (referring to the above practical implementation, a new session is opened). For example, in the linked list collision resolution mechanism the new item is often inserted at the head of the linked list associated with the hash table entry h(u);

2. retrieval of a data item: this operation is also referred to as "search" or "find", and consists of locating a data item in the table according to its key (In the above practical example, the socket of a received packet), and then returning all the information on that item. For example, in the linked list mechanism, the retrieval of the item u is carried out by moving through the whole linked list associated with the entry h(u): the key of each data item in the linked list is compared with the key of the searched item u: if they are identical, all the information stored for that item is returned to the functional entity that initiated the retrieval operation (in the above practical implementation, the session recognition module 215, or, ultimately, the main filtering processing module 220). If the keys are not identical, then the next data item in the linked list is checked. If none of the items. In the (linked list associated with the) hash table entry h(u) has a key equal to the key of the searched item u, then the operation returns a failure code;

3. deletion of a data item: the item u whose key is provided as an input to this operation is removed from the hash table (in the above practical implementation, a session is closed). For example, if a linked list is used as a collision resolution mechanism, the same algorithm is used to locate the correct item as was described above in connection with the retrieval operation. If the item is not located, a failure code is returned. If the item is located, then it is removed from the linked list, in any known way.

As discussed previously, systems using hash tables are vulnerable to malicious attacks, which essentially are directed to cause a number of collisions so high that the linked list associated with one or more table entry becomes very long, with the consequence that the time taken by the hash table for performing its task increases to such an extent that no further requests (e.g., recognition of the sessions to which newly received data packets belong) can be serviced.

According to an embodiment of the present invention, a method and a system are provided that allow the user of a hash table to be able to recover from an attack. The method and the system according to the present invention are based on, but not limited to, varying the hash function used to map input items to hash table entries (in other words, the hash function used is not kept constant).

In greater detail, according to an embodiment of the present invention, a currently used hash table is regarded as vulnerable to attacks like DoS when the hash table does not work as well as it should; this for example occurs when at least one entry of the table stores too many data items, and one or more of the operations of insertion, deletion and retrieval of data items take significantly more time than they should, i.e. they take a time exceeding a predetermined (and, possibly, respective) time.

Figure 4A:
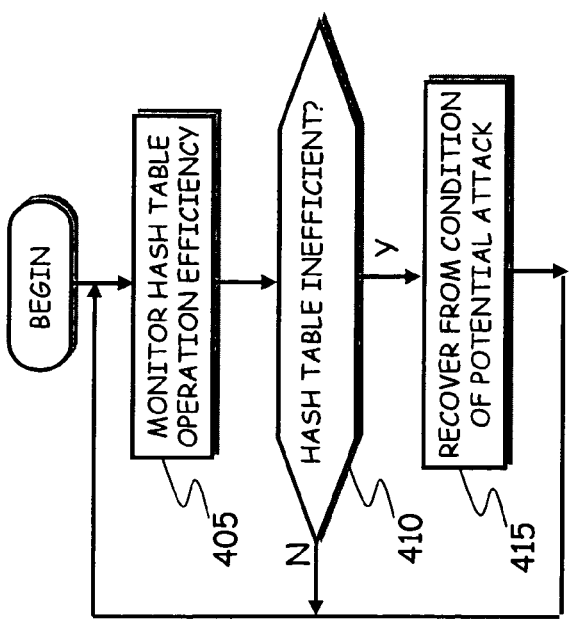
FIG. 4A is a schematic flowchart illustrating the main steps of a method according to an embodiment of the present invention.

The method according to the described invention embodiment, as shown in the schematic flowchart of FIG. 4A, includes two main phases. A first phase includes identifying that the hash table currently used does not work with the required efficiency, i.e. it is vulnerable to a DoS attack. This phase of identification of potential threats to the system security includes monitoring the efficiency of the hash table operations (block 405) and, in case the hash table efficiency is below a predetermined level (block 410), decreeing a condition of potential attack (exit branch Y of block 410). A second phase involves recovering from the condition of potential attack by transferring the hash table content, so as to work with a different hash function (block 415).

Considering the practical implementation described above, these operations are for example performed by the hash table attack management module 290.

Figure 4B:
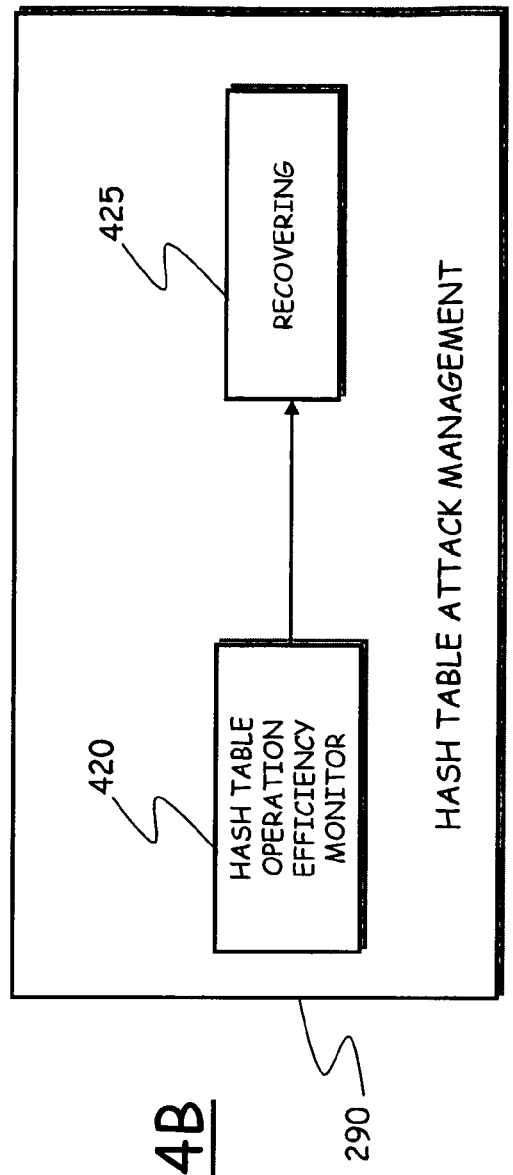
FIG. 4B schematically shows in terms of functional blocks a module adapted to carry out the method of FIG. 4A, in an embodiment of the present invention.

FIG. 4B schematically shows the essential functional blocks of the hash table attack management module 290: a hash table operation efficiency monitor module 420 suitable to monitor the hash table operation efficiency; a recovering module 425 is designed to perform the actions for recovering from the condition of potential attack.

According to an embodiment of the present invention, two alternative (but not limitative) techniques for measuring how fast the operations of data items insertion, deletion and retrieval are performed on the hash table are proposed. If the result of the measurement exceeds a predetermined threshold θ, then the hash table is declared to be inefficient or under attack.

According to an embodiment of the invention, a first measurement technique calls for measuring the average number of operations required for a potential retrieval operation of a data item already stored in the table. The reason why only a data item retrieval operation is considered resides in that the Applicant has observed that the time necessary for data item retrieval and data item deletion is almost identical (deletion of a data item involves first finding the data item, as in a retrieval operation, and then removing it from its entry; the latter is a fast operation, and is not dependent on the structure of the hash table), and that the time necessary for a data item insertion operation is O(1) (i.e., it is constant).

Let m denote the number of entries in the hash table that store at least one item. Let also $n_1, \ldots, n_{|T|}$ denote the number of data items that are stored in (i.e., associated with) the $|T|$ entries of the hash table. Retrieving a generic data item stored in the hash table requires a number of steps $S_1$ equal to:

$$S_1 = \frac{1}{2m} \sum_{i=1}^{|T|} n_i,$$

provided that the data item is chosen at random from among all items in the table. If the number of steps $S_1$ is such that $S_1 < \theta$, i.e. less steps are required than the predetermined threshold, then the table is declared to work well. If instead the inequality $S_1 \geq \theta$ is true then the table is declared to be inefficient.

Figure 5:
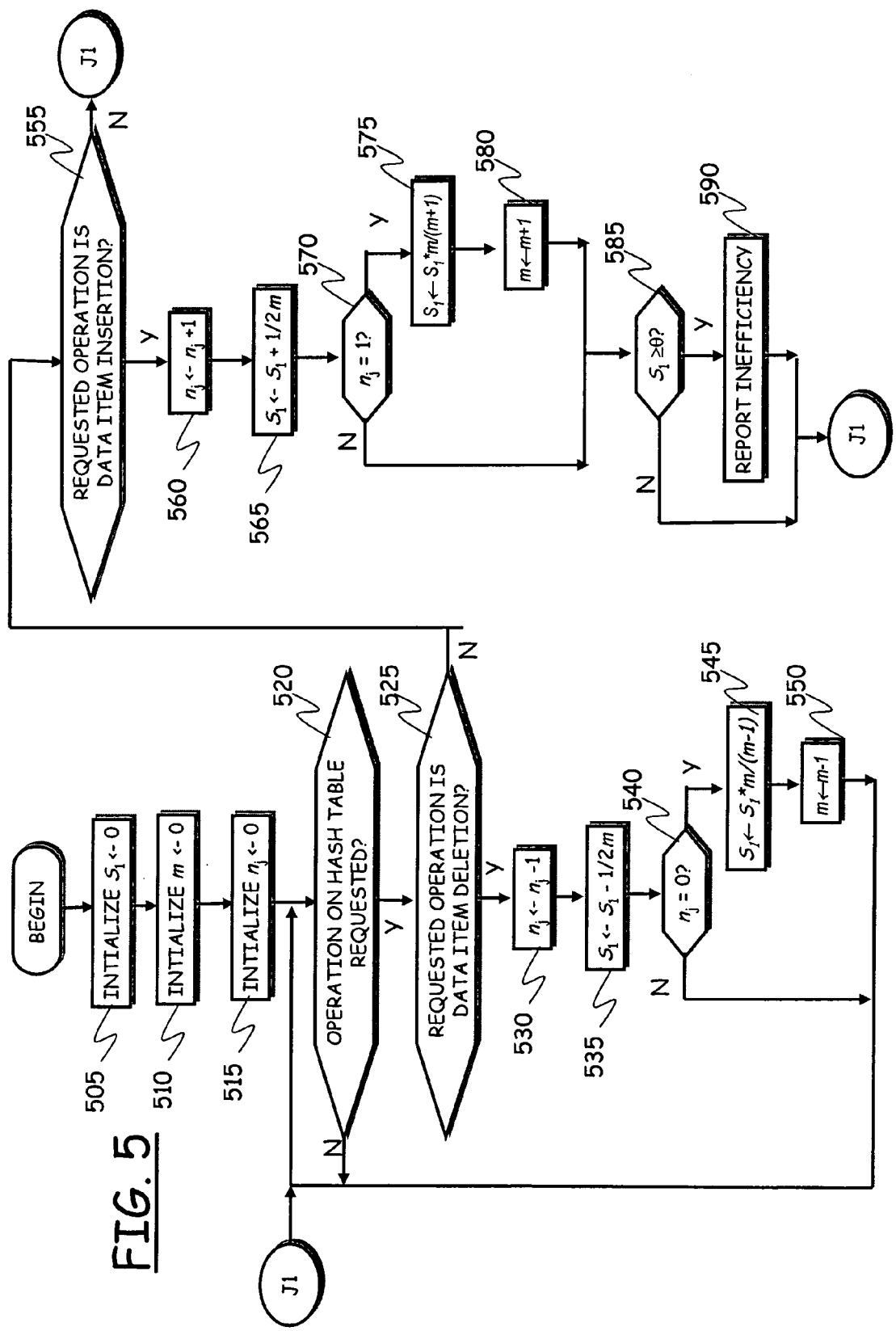
FIG. 5 is a schematic flowchart illustrating a method of measuring a hash table operation efficiency according to an embodiment of the present invention, adapted to be used in the method of FIG. 4.

Referring to the schematic flowchart of FIG. 5, a possible implementation of the first measurement technique is the following.

A variable used for storing the current value of the quantity $S_1$ is initialized, when the hash table is empty, to 0 (block 505) (hereinafter, $S_1$ will be used to refer to both the quantity $S_1$ and the corresponding variable).

Similarly, a variable for storing the current value of the quantity m is initialized, when the hash table is empty, to 0 (block 510) (hereinafter, m will be used to refer to both the quantity m and the corresponding variable).

At each hash table entry, the number of data items that are stored in (associated with) that entry is stored (that is, the value $n_j$ is stored at the j-th entry of the hash table); when the hash table is empty, the value $n_j$ is initialized to 0 for every table entry (block 515).

Then, the method monitors the operations performed on the hash table (block 520).

In case of a data item deletion operation at the generic, $j^{th}$ entry (block 525, exit branch Y), after the operation has been performed the value $n_j$ is updated (decreased by one):

$n_j \leftarrow n_j-1$ (block 530); then, the quantity $S_1$ is updated to $S_1 \leftarrow S_1 - \frac{1}{2} m$ (block 535); afterwards, it is checked whether the value $n_j$ is equal to 0 (block 540): in the affirmative case (block 540, exit branch Y), the quantity $S_1$ is updated to $S_1 \leftarrow S_1*m/(m-1)$ (block 545) and the quantity m is updated to $m \leftarrow m-1$ (block 550).

In case of a data item insertion operation at the generic, $j^{th}$ entry (block 555, exit branch Y), after the operation has been performed, the value $n_j$ is updated (increased by one): $n_j \leftarrow n_j+1$ (block 560); then, the quantity $S_1$ is updated to $S_1 \leftarrow S_1 + \frac{1}{2} m$ (block 565). It is then checked whether the value $n_j$ equals 1 (block 570); in the affirmative case (block 570, exit branch Y), the quantity $S_1$ is updated to $S_1 \leftarrow S_1*m/(m+1)$ (block 575), and the quantity m is updated to $m \leftarrow m+1$ (block 580).

It is then assessed whether the quantity $S_1$ has reached or exceeded the predetermined threshold: $S_1 \geq \theta$ (block 585). In the affirmative case (block 585, exit branch Y), the hash table is declared to be inefficient (block 590), and recovery actions may be performed (as discussed in the following).

According to another embodiment of the present invention, a second measurement technique involves counting the actual number of data items processed for an average estimation of data item insertion, deletion or retrieval operation duration. For example, if the considered operation is a retrieval of a data item that is stored as the third of five items in the linked list associated with a certain hash table entry, then the number of processed items for this operation is equal three. Let k denote the number of operations measured. For the generic operation j out of the k measured operations, the number of actual data items processed is denoted by $v_j$. The following quantity $S_2$ is calculated:

$$S_2 = \frac{1}{k} \sum_{j=1}^{k} v_j.$$

If the calculated quantity $S_2 < \theta$, then the hash table is declared to work well; if the inequality $S_2 \geq \theta$ holds, then the hash table is declared to be inefficient.

Compared to the first measurement technique, the second measurement technique has the advantage that it doesn't assume that all items are accessed by the user with the same probability; account is instead taken of the patterns of usage of the hash table in the last k operations. However, the first measurement technique, differently from the second one, does not try to forecast how efficient the hash table will be in the future based on past experience.

Referring to the schematic flowchart of FIG. 6, a possible implementation of the second measurement technique is the following.

A variable for storing the current value of the quantity $S_2$ is initialized, when the hash table is empty, to 0 (block 605) (hereinafter, $S_2$ will be used to refer to both the quantity $S_2$ and the corresponding variable).

A cyclic linked list (or a cyclic array) is created for holding the k values $v_1, \ldots, v_k$ defined above. All k values $v_1, \ldots, v_k$ are initialized, when the hash table is empty, to 0 (block 610).

Then, the method monitors the operations performed on the hash table (block 615). In case a data item insertion, retrieval or deletion operation is performed on the hash table (block 615 exit branch Y), the number q of data items encountered until the operation is complete is counted (block 620).

The quantity $S_2$ is then updated to: $S_2 \leftarrow S_2 + (q-v_1)/k$ (block 625).

The cyclic linked list holding the k values $v_1, \ldots, v_k$ is also updated, so that it stores the number of items encountered in each of the last k operations (block 630). In order to do so, the old value of $v_1$ is removed, while all the other values are shifted. That is, the old value of $v_2$ becomes the new value of $v_1$, the old value of $v_3$ becomes the new value of $v_2$, and so on until the old value of $v_k$ becomes the new value of $v_{k-1}$. Finally, the number q is stored as the new value of $v_k$. It is observed that this cyclic shift is implemented in O(1) steps in a cyclic linked list (or array).

It is then assessed whether the quantity $S_2$ has reached or exceeded the predetermined threshold $S_2 \geq \theta$ (block 635); in the affirmative case (block 635, exit branch Y), the hash table is declared to be inefficient (block 640), and recovery actions may be performed (as discussed in the following).

Hereinafter, two methods according to possible embodiments of the present invention for recovering from a situation of at least potential attack against a hash table are described, making reference to the simplified flowchart of FIGS. 7 and 8.

Both the proposed methods calls for changing the hash function when the situation of at least potential attack is determined. The (complex of) operation(s) of changing the hash function is referred to as "re-hashing".

According to a first method (FIG. 7), upon detecting a situation of potential attack (block 705, exit branch Y), for example because the hash table becomes inefficient, all operations on the hash table, i.e. data item insertion, deletion and retrieval are prevented until rehashing is complete (block 710).

A new hash function is selected (block 715); for example, the new hash function is chosen at random from a universal family of hash functions. Later in this description, a method and system for efficiently implementing also in hardware a universal family of hash functions will be described.

All the items in the hash table are then moved from the hash table to a temporary data structure (block 720).

The hash table is then initialized to an empty state (block 725).

Every item in the temporary data structure is inserted into the hash table using the new hash function (block 730), and finally the operations (insertion, retrieval, deletion) on the hash table are re-allowed (block 735).

Using this method, the re-hashing process may take a non-negligible time to complete, during which no operations on the hash table can take place.

A second method according to the present invention is more flexible, and reduces the probability of having to perform a re-hashing operation. Essentially, as schematically depicted in FIG. 9, the method includes holding 905-1, ..., 905-r, instead of a single one. The r different hash tables will use r different hash functions. Only one of the r hash tables, in the drawing the hash table 905-1, called the active hash table, is used for data item insertion operations.

Referring to FIG. 8, if the current active hash table becomes inefficient (block 805, exit branch Y), thus indicating for example that a condition of potential attack is detected, the following actions are performed.

It is firstly assessed whether, among the r different hash tables, there is at least one empty table (block 810). In the negative case (block 810, exit branch N), a re-hashing operation takes place as follows.

All operations on the hash tables, i.e. data item insertion, deletion and retrieval are prevented on all the r different hash tables, until rehashing is complete (block 815).

A new hash function is selected (block 820); for example, the new hash function is chosen at random from a universal family of hash functions, particularly as described later.

Then, all the data items stored in the r different hash tables are moved temporarily from the hash tables to a temporary data structure (block 825).

Subsequently, the r hash tables are initialized to an empty state (block 830).

One of the r hash tables, for example the first hash table number, is marked as the active hash table (block 835). Every data item stored in the temporary data structure is then inserted into the active hash table using the new hash function (block 840).

The re-hashing operation is thus completed: the operations (insertion, retrieval, deletion) on the hash table are re-allowed (block 845).

In case instead, among the r different hash tables, an empty table is found (block 810, exit branch Y), then such empty table (or, if more than one empty hash table exist, the first encountered empty hash table) becomes the active table instead of the previous active table (block 850). This to also implies a transfer of the whole content of the previous active table into the new active table; the previous active table will keep the uncopied content until the transfer process is completed, to allow correct operativity during the transfer time (in fact, complete transfer will take a time that can be sensibly higher than the time of packets arrival and of normal operations thereon). The new active table will have a hash function different from that of the previous active table.

It should be observed that the use of r different hash tables, instead of a single one, and the re-hashing method described above (that, when the current active hash table is detected to be inefficient, calls for swapping to another active hash table selected among the empty hash tables), may cause the data items to be stored in more than one hash table, despite the fact that data item (insertions can be performed only on the active table.

Thus, in an embodiment of the present invention, the operations of retrieval and deletion of data items should be performed on all the r hash tables, not only on the currently active hash table, because the data item to be retrieved or deleted may be stored in any one of the r hash tables. This happens when the process of copying the data to the new active table, done in background, is particularly slow compared to the frequency at which active table changes are required (the system likely is experiencing an attack).

However, in a preferred embodiment, at least one of the r hash tables, e.g. the currently active hash table, stores all the data items, so that searching for them for retrieval or deletion can be performed only on one hash table. According to an embodiment of the present invention, the data items that are stored in hash tables that are not the currently active hash table should be moved (i.e., copied into) to the currently active hash table. In particular, in a preferred embodiment of the invention the data item can be moved "in background", when the hash tables are not being used for insertion, deletion or retrieval operations.

According to the two possible described embodiments of the invention, the operations on the r different hash tables can therefore be summarized as in the following:

data item insertion: this operation occurs only on the currently active hash table;

data item retrieval: in one embodiment of the present invention, this operation is performed on each of the non-empty tables; in another embodiment of the invention, it is performed only on the currently active hash table;

data item deletion: first, a data item retrieval operation is performed (as discussed above, on all the tables or just on the currently active table) to locate the data item, and then the located data item is deleted from that table;

data item transfer according to an embodiment of the present invention, an item stored in a non-empty table, which is not active, is moved, i.e. copied to the currently active hash table, and, possibly even deleted from the hash table wherein it was stored. If this data item was the last data in the table from which it was deleted, then that hash table is marked as empty.

Thanks to the use of r hash tables instead of a single one, the regular operations of data item insertion, deletion and retrieval need to be stopped only after all the r hash tables have become inefficient, and, in the invention embodiment that provides for having the data item transfer from non-active hash tables to the currently active hash table, only if there was not enough time to empty one of them as described below.

Thanks to the present invention, the robustness of systems using hash tables against attacks, particularly of the DoS type, is increased: the hash function is changed not arbitrarily, but as soon as situation is detected that may signal the onset of an attack, before the system totally looses efficiency.

Hereinafter, a method and system for generating a sequence of universal families of hash functions particularly suitable for use in the method of the present invention is described.

The following is a list of symbols that will be used in the following description, together with the corresponding explanation. Some of the symbols relate to entities that have already been introduced in the foregoing.

U: the universe of all the possible input objects to the hash function, i.e. the universe of all the stored elements;

T: a hash table of size $2^\beta$, where $\beta$ is an integer, m: the number of non-empty entries in the hash table T (i.e., the number of entries that store at least one data item);

$v_i$: number of data items stored in the generic entry i out of the non-empty entries of the table T;

k: a number of insertion, deletion or retrieval operations;

H: a family of hash functions, each function mapping an element of the universe U to an entry in the table T;

h: a hash function in the family H, with h:U→T;

|T|: the size of the hash table T;

$\alpha$: the number of input bits of a generic hash function h in the family H (thus, $2^\alpha$ is the size of the input universe U);

$\beta$: the number of output bits of a generic hash function h in the family H ($2^\beta$ is the size of the hash table T);

A: an upper limit set to the value $\alpha$;

B: an upper limit set to the value $\beta$;

$\theta$: a threshold used to assess whether the operation of the hash table T is inefficient (because potentially under attack);

u, v, w: binary vectors made up of a bits each;

$u_1, \ldots, u_\alpha, v_1, \ldots, v_\alpha, w_1, \ldots, w_\alpha$: the representation in bits of the binary vectors u, v, w;

<u,v>: the binary scalar product of vectors u and v, $<u,v>=\Sigma_{i=1}^\alpha u_i v_i \mod 2$; this product can be either 0 or 1;

$BM_{\alpha\beta}$: a family of hash functions according to an embodiment of the present invention;

P[ ]: the probability of a certain event (the event described within the brackets);

•: the multiplication operation of a vector by a matrix.

According to an embodiment of the present invention, the universe U of all the possible input data items is assumed to be composed by all the binary strings (or vectors) of length $\alpha$ (it can also be denoted $\{0,1\}^\alpha$). Based on this assumption, the elements of the universe U are always encoded as binary strings, and their maximum length $\alpha$ is known in advance. It is observed that this is however the case in almost any practical software or hardware implementation of hash tables, thus this constraint does not limit the applicability of the invention in any significant way.

Also, according to an embodiment of the present invention, the size of the hash table T is assumed to be equal to $2^\beta$ entries, where $\beta$ denotes the number of output bits of the hash function h. Let H be a set of functions, H={h|h: U→T}. H forms a universal family of hash functions if, for every two elements u, v∈U, the following holds: P[h(u)=h(v)]=1/|T|, where the probability P is calculated over a random, uniform choice of the function h from among all the functions in the set H.

A sequence of universal families of hash functions is an infinite sequence $H_1, H_2, \ldots$, where $H_i$ is a universal family of hash functions for every i=1, 2, . . . .

According to an embodiment of the present invention, a sequence of universal families of hash functions (i.e., according to the above definition, an infinite number of universal families) is defined, that, as will be discussed, allows an efficient implementation in hardware. In particular, for any two natural numbers $\alpha$ and $\beta$, a universal family of hash functions, denoted by $BM_{\alpha\beta}$, is defined. The family of hash functions $BM_{\alpha\beta}$ is represented by the set of all binary matrices that have $\beta$ rows and $\alpha$ columns. A generic hash function h∈$BM_{\alpha\beta}$ is thus represented by a binary matrix. For an element u∈U, the value h(u) is computed by regarding u as a binary vector of length $\alpha$ bits, and then by computing the product h·u of matrix and vector. The output is a $\beta$ bits vector which is regarded as an entry in the hash table T.

The family of hash functions $BM_{\alpha\beta}$ as defined above has properties that make it particularly suitable for the method of the present invention.

One property is the following. Let u and v be two different binary vectors of length $\alpha$. If a binary vector w is chosen at random out of all the binary vectors of length $\alpha$, then $$P[<u, w> = <v, w>] = \frac{1}{2}.$$

In fact, since u and v are different vectors, then, for some j, $1 \leq j \leq \alpha$, it is $u_j \neq v_j$. Let the $2^\alpha$ binary vectors of length $\alpha$ be partitioned into $2^{\alpha-1}$ pairs of vectors. The two strings in each such a pair are identical one to the other in every bit except for the bit number j, which is 0 in one of them and 1 in the other.

Let w(0) and w(1) be such a pair of strings, so that $w(0)=w_1, \ldots, w_{j-1}, 0, w_{j+1}, \ldots, w_\alpha$ and $w(1)=w_1, \ldots, w_{j-}, 1, w_{j+1}, \ldots, w_\alpha$, where $w_1, \ldots, w_{j-1}, w_{j+1}, \ldots, w_\alpha$ are all bits. Let the two quantities:

$$u' = \sum_{i=1, i\neq j}^{\alpha} w_i u_i \mod 2 \text{ and } v' = \sum_{i=1, i\neq j}^{\alpha} w_i v_i \mod 2 \text{ be considered.}$$

Either $u' = v'$ or $u' \neq v'$. If $u' = v'$ then:

$$<u, w(0)> = \sum_{i=1}^{\alpha} u_i w_i \mod 2 =$$

$$(u' + 0u_j) \mod 2 = (v' + 0v_j) \mod 2 = \sum_{i=1}^{\alpha} v_i w_i \mod 2 = <v, w(0)>$$

and:

$$<u, w(1)> = \sum_{i=1}^{\alpha} u_i w_i \mod 2 =$$

$$(u' + 1u_j) \mod 2 \neq (v' + 1v_j) \mod 2 = \sum_{i=1}^{\alpha} v_i w_i \mod 2 = <v, w(1)>$$

So, $<u, w(0)> = <v, w(0)>$ but $<u, w(1)> \neq <v, w(1)>$.

-continued

If, on the other hand, $u' \neq v'$ then:

$$<u, w(0)> = \sum_{i=1}^{\alpha} u_i w_i \mod 2 =$$

$$(u' + 0u_j) \mod 2 \neq (v' + 0v_j) \mod 2 = \sum_{i=1}^{\alpha} v_i w_i \mod 2 = <v, w(0)>$$

and:

$$<u, w(1)> = \sum_{i=1}^{\alpha} u_i w_i \mod 2 =$$

$$(u' + 1u_j) \mod 2 = (v' + 1v_j) \mod 2 = \sum_{i=1}^{\alpha} v_i w_i \mod 2 = <v, w(1)>$$

Thus, $<u, w(0)> \neq <v, w(0)>$ but $<u, w(1)> = <v, w(1)>$.

The above reasoning shows that, for each of the $2^{\alpha-1}$ pairs of vectors defined above, there is one vector such that the scalar product of that vector and the vector u is equal to the scalar product of the vector and the vector v, while the scalar product of the other vector of the pair with the vector u is different from the scalar product of the other vector with the vector v. Therefore, there are exactly $2^{\alpha-1}$ vectors w such that $<u,w>=<v,w>$. In other words, when choosing a binary vector of length $\alpha$ at random out of the $2^\alpha$ possible vectors, it is:

$$P[<u, w> = <v, w>] = \frac{1}{2}.$$

The following explanation shows that $BM_{\alpha\beta}$ is a universal family of hash functions. Let u and v be two elements in the universe U, hence u and v are binary vectors of length $\alpha$. If a hash function h is chosen uniformly at random from $BM_{\alpha\beta}$ then:

$$P[h(u) = h(v)] = \frac{1}{2^\beta}.$$

By definition, h is a random binary matrix of $\beta$ rows and $\alpha$ columns, and, still by definition, h(u)=h·u. Let the rows of h be denoted by $h^1, \ldots, h^\beta$; hence, $h(u)=<u,h^1>, \ldots, <u,h^\beta>$. As demonstrated above, for each i, $1 \leq i \leq \beta$ the above lemma it is:

$$P[<u, h^i> = <v, h^i>] = \frac{1}{2}.$$

Since h is chosen at random, each of its rows is a random binary vector of length $\alpha$ chosen independently of all other rows; therefore:

$$P[h(u) = h(v)] =$$

$$P[<u, h^1> = <v, h^1>, \ldots, <u, h^\beta> = <v, h^\beta>] = \left(\frac{1}{2}\right)^\beta.$$

which proves that $BM_{\alpha\beta}$ is a universal family of hash functions.

The universal family of hash functions $BM_{\alpha\beta}$ defined above can be efficiently implemented in hardware, as described in the following. The implementation includes three main phases: hardware setting (design and manufacturing phase), hash function initialization, and hash function computation.

Figure 10:
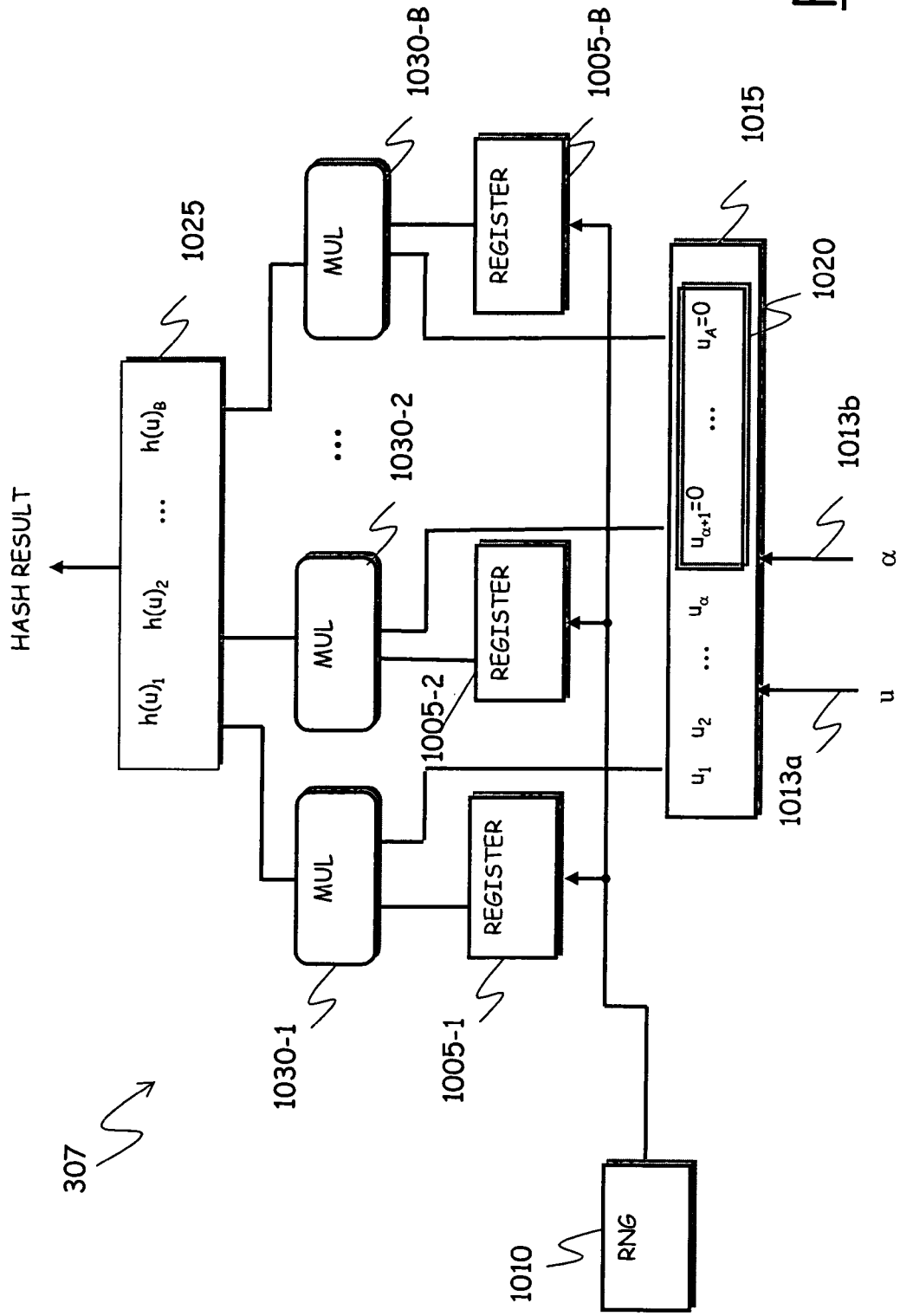
FIG. 10 schematically shows an implementation of a hash calculator according to an embodiment of the present invention.

In the design and manufacturing phase of a device intended to implement a hash function according to the present invention, the upper limits A, B are set, and memory resources and logic circuits for the hash function and the hash table are defined. As mentioned in the foregoing, A is an upper limit on the value α; in other words, the key, u, of any input item mapped to the hash table is of length at most equal to A. B is an upper limit on β. As schematically depicted in FIG. 10 (showing the hash calculator 307 previously described or, more in general, a device intended to implement a hash function according to the present invention), the hash function h may thus be implemented as an array of B registers 1005-1, 1005-2, . . . , 1005-B, each one of size A bits.

Preferably, for a hardware implementation, the values A and B are multiples of a byte or of a word, i.e. A and B are equal to 8 bits, 16 bits or multiples thereof. In terms of the representation of a hash function as a matrix, each such register represents a single row in the matrix. The hash table is an array of $2^B$ entries. The size of each entry is dependent on the specific requirements for the hardware, i.e. the information contained in the entry and the form chosen to conveniently represent it.

In operation, the hash function has to be initialized (i.e., the content of the B registers 1005-1, 1005-2, . . . , 1005-B, of size A bits is to be set to a predetermined initial value). According to an embodiment of the present invention, this is a process that involves choosing a new hash function at random out of the universal family of hash functions. The random choice may be dependent on random data which is obtained from a random or pseudo-random generator 1010. The generator 1010, which may be external to the hash calculator 307 (i.e., a random or pseudo-random number generator already provided in the device implementing the hash table, for different purposes, may be exploited), provides a random number including AB random bits. The bits are then used to load the B registers 1005-1, 1005-2, . . . , 1005-5 of size A bits representing the hash function, each register being loaded with A respective bits. It is pointed out that the use of a random or pseudo random number generator is not limitative: a predefined list of values, provided it is sufficiently large, may be suitable as well.

For the computation of the hash result (hash function computation), a key u is received as a first input 1013a and the key length a (in bits) as a second input 1013b; the computation produces as an output an entry h(u) of length B.

The value h(u) is computed in several stages.

In a first stage, the input is prepared. The input vector u and its length a are used to load an input register 1015 of length A bits. In other words, the input string u is loaded into the input register 1015. Since the input string u is long α≧A, the remaining (unused) portion 1020 of the register 1015 is padded by, e.g., zero bits (in other words, all bits in positions α+1 to A are set to, e.g., zero).

In a second stage, the hash function is computed over the padded input stored in the input register 1015 to obtain h(u)=h·u. In particular, the content of each hash function register 1005-1, 1005-2, . . . , 1005-B, which represents a row in the matrix forming the hash function, is combined with the padded input stored in the input register 1015 in a scalar multiplication performed by a respective scalar multiplier 1030-1, 1030-2, . . . , 1030-B that produces one of the output bits. All of these output bits are preferably computed in parallel.

The bits resulting from the scalar multiplication operations are stored in an output register 1025, of size B bits. The bit resulting from a scalar multiplication operation between the padded input and the i-th row $h_i$ of the hash function is denoted $h(u)_i$. All of these bits together form the output h(u), which forms in turn the hash result.

The scalar multiplication operation of binary vectors can be carried out by a combination of logic AND gates, which correspond to a binary multiplication operation, and of XOR logic gates, which correspond to a binary addition operation. The logic circuit 1030-h depicted in FIG. 11 is a generic one of the scalar multipliers 1030-1, 1030-2, . . . , 1030-B, and is adapted to compute one bit of the hash function value by means of a scalar multiplication. The circuit comprises a plurality of A two-inputs AND logic gates 1105-1, 1105-2, . . . , 1105-A, which receive at a first input one of the bits stored in the input register 1015, and at a second input one of the bits of a respective one of the hash function registers 1005-1, 1005-2, . . . , 1005-B. The outputs of the A AND gates 1105-1, 1105-2, . . . , 1105-A are fed to a XOR logic gate 1110; the output of the XOR gate 1110, which forms the output of the scalar multiplier 1030-h, is $$\sum_{i=1}^{A} h_i u_i \bmod 2,$$

where $u_1, \ldots, u_A$ is the padded input, and $h_1, \ldots, h_A$ are all the bits of one of the hash function registers (representing a row in the matrix).

The invention has been herein described by means of some embodiments thereof. Those skilled in the art will however appreciate that several modifications to the described embodiments, as well as alternative invention embodiments are possible, without departing from the scope of protection defined in the attached claims.

The invention claimed is:

1. A method for operating a telecommunications device using at least one hash table, comprising:
   storing first session data comprising received data packets in the at least one hash table by means of a first hash function;
   monitoring efficiency of the at least one hash table in performing at least a predetermined operation; and
   when the efficiency is below a predetermined threshold,
      storing second session data comprising received data packets in the at least one hash table by means of a second hash function different from the first hash function,
      temporarily preventing operations of insertion, deletion and retrieval in the at least one hash table,
      transferring the first session data and the second session data stored in the at least one hash table to a temporary data structure,
      initializing the at least one hash table to an empty state,
      inserting back the first session data and the second session data transferred to the temporary data structure into the at least one hash table by using the second hash function, and
      re-allowing the operations of insertion, retrieval and deletion on the at least one hash table.

2. The method of claim 1, further comprising selecting the second hash function at random from a universal family of hash functions.

3. The method of claim 1, wherein the at least one hash table is a current active hash table in a plurality of hash tables.

4. The method of claim 3, wherein, when the efficiency is below a predetermined threshold, further includes:
- ascertaining that there is an empty hash table among the plurality of hash tables;
- designating the current active hash table as a previous active hash table and the empty hash table as a new active hash table, and storing the second session data in the new active hash table;
- transferring all the first session data stored in the previous active hash table into the new active hash table; and
- keeping a copy of all the transferred first session data in the previous active hash table.

5. The method of claim 3, wherein, when the efficiency is below a predetermined threshold, further includes:
- ascertaining that there is no empty hash table among the plurality of hash tables;
- temporarily preventing operations of insertion, deletion and retrieval in all the plurality of hash tables;
- transferring all the first session data stored in all the plurality of hash tables to a temporary data structure;
- initializing all the plurality of hash tables to an empty state;
- designating one of the plurality of hash tables as a new active hash table and inserting all the first session data transferred to the temporary data structure into the new active hash table by using the second hash function; and
- re-allowing the operations of insertion, retrieval and deletion on the new active hash table, and storing the second session data in the new active hash table.

6. The method of claim 1, wherein monitoring the efficiency of the at least one hash table comprises measuring an average number of elementary operations required by the at least one hash table for performing the predetermined operation.

7. The method of claim 1, wherein monitoring the efficiency of the at least one hash table comprises counting a number of stored data items processed by the at least one hash table for performing the predetermined operation.

8. The method of claim 1, wherein the predetermined operation comprises at least one among a data insertion operation, a data retrieval operation and a data deletion operation.

9. A telecommunication device comprising:
- a memory storing at least one hash table;
- a hash calculator configured to calculate a hash value based on a predetermined hash function, and to provide the calculated hash value to the at least one hash table as a key for accessing the at least one hash table, wherein the hash calculator comprises:
  - a plurality of registers, wherein:
    - the plurality of registers comprises a number of registers equal to a predefined maximum number of output bits of the predetermined hash function to be implemented,
    - each register of the plurality of registers has a size equal to a predefined maximum number of input bits of the predetermined hash function to be implemented,
    - each register of the plurality of registers is configured to be loaded with hash function configuration data defining the predetermined hash function to be implemented, and
  - a plurality of multipliers such that each multiplier is associated with a respective register of the plurality of registers wherein each multiplier is configured to receive content of an associated register and a hash function input, and to perform multiplication thereof, an output of the multiplier forming one of the predetermined hash function output bits;
- wherein the telecommunication device is configured to store first session data comprising received data packets in the at least one hash table by means of a first hash function; and
- a hash table monitor module configured to:
  - monitor an efficiency of the at least one hash table in performing at least a predetermined operation, and, in case the efficiency is below a predetermined threshold, the hash table monitor module is further configured to:
    - select a second hash function different from the first hash function,
    - store second session data comprising received data packets in the at least one hash table by means of the second hash function,
    - temporarily prevent operations of insertion, deletion and retrieval in the at least one hash table,
    - transfer the first session data and the second session data stored in the at least one hash table to a temporary data structure,
    - initialize the at least one hash table to an empty state,
    - insert back the first session data and the second session data transferred to the temporary data structure into the at least one hash table by using the second hash function, and
    - re-allow the operations of insertion, retrieval and deletion on the at least one hash table.

10. The device of claim 9, wherein the hash table monitor module is configured for measuring an average number of elementary operations required by the at least one hash table for performing the predetermined operation.

11. The device of claim 9, wherein the hash table monitor module is configured for counting a number of stored data items processed by the at least one hash table for performing the predetermined operation.

12. The device of claim 9, wherein the predetermined operation comprises at least one among a data insertion operation, a data retrieval operation and a data deletion operation.

13. The device of claim 9, wherein:
- the at least one hash table comprises at least a first and a second hash table, the first hash table configured to be used as a current active hash table wherein new data items are stored; and
- the hash table monitor is further configured to:
  - ascertain if the second hash table is empty when the efficiency of the first hash table is below a predetermined threshold, and, in an affirmative case, set the second hash table as the current active hash table, whereas in a negative case, selecting a new hash function to be used by the hash calculator and to cause rehashing.

14. The device of claim 9, further comprising a source of hash function configuration data operatively associated with the plurality of registers for providing thereto the hash function configuration data.

15. The device of claim 14, wherein the source of hash function configuration data comprises a random number generator.

16. The device of claim 9, further comprising a hash function input register having a size at least equal to the maximum number of input bits of the hash functions to be implemented, the input register configured to receive the hash function input and to feed the plurality of registers.

17. The device of claim 9, further comprising an output register of size at least equal to the maximum number of output bits of the hash functions to be implemented and operatively coupled to the multipliers so as to receive and store output thereof.

18. The device of claim 9, wherein each of the plurality of multipliers comprises:
  a plurality of AND logic gates, each logic gate configured to perform a logic AND of a respective bit of one of the plurality of registers and a respective bit of the hash function input; and
  an XOR logic gate configured to receive outputs of the plurality of AND logic gates.

* * * * *